United States Patent Office 2,891,960
Patented June 23, 1959

2,891,960

BENZOTHIAZOL-2-SULFONYL-UREAS AND A PROCESS FOR THEIR MANUFACTURE

Heinrich Ruschig, Bad Soden (Taunus), Hans Wagner, Walter Aumüller, Gerhard Korger, and Josef Scholz, Frankfurt am Main, and Alfred Bänder, Hofheim (Taunus), Germany, assignors to Farbwerke Hoechst Aktiengesellschaft vormals Meister Lucius & Brüning, Frankfurt am Main, Germany, a corporation of Germany No Drawing. Application October 25, 1957
Serial No. 692,274

Claims priority, application Germany November 3, 1956

4 Claims. (Cl. 260—306.6)

This invention relates to benzothiazol-2-sulfonyl-ureas and to a process for their manufacture.

Compounds of the general formula

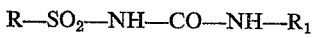

$$R\text{—}SO_2\text{—}NH\text{—}CO\text{—}NH\text{—}R_1$$

have already been described in previous copending patent applications to be valuable medicaments having a blood-sugar reducing action. In the above formula the substituent R represents a phenyl radical which may be substituted by one or two radicals selected from the group consisting of halogen atoms and/or alkyl and/or alkoxy radicals, the alkyl groups of which carry advantageously up to 6 carbon atoms; or R represents an aliphatic or cycloaliphatic hydrocarbon radical containing 3-8 carbon atoms; or R represents the naphthalene-(2), 5.6.7.8-tetrahydronaphthalene-(2)- or 4-phenoxyphenyl- or 4-biphenyl radical; and the substituent $R_1$ represents an alkyl, alkenyl, cycloalkyl or cycloalkylalkyl radical containing 2-8 carbon atoms; or a saturated or unsaturated, open-chained or cyclic hydrocarbon radical interrupted by oxygen or sulfur; or $R_1$ represents a phenyl alkyl radical, the alkyl chain of which contains 2-4 carbon atoms.

This invention provides compounds of the general formula

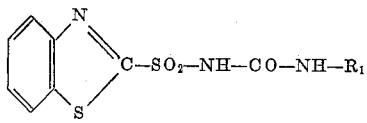

and the salts thereof, wherein $R_1$ represents an aliphatic or cycloaliphatic, saturated or unsaturated hydrocarbon radical, or a saturated or unsaturated, open-chained or cyclic hydrocarbon radical interrupted by oxygen or sulfur, or a phenyl alkyl radical the alkyl chain of which contains 2-4 carbon atoms. The above compounds and their salts are valuable medicaments and are especially distinguished by their strong blood sugar-reducing activity and by a low toxicity.

More particularly, the substituent $R_1$ may stand for the following radicals: aliphatic saturated radicals containing 2-8 carbon atoms, for example ethyl, propyl, butyl, isobutyl, secondary butyl, tertiary butyl, pentyl, hexyl, heptyl and octyl, and it is immaterial whether these radicals have a straight or branched chain; aliphatic unsaturated radicals, for example allyl and crotyl; cycloaliphatic radicals, for example cyclopentyl, cyclohexyl, cyclohexylmethyl, or cyclohexylethyl.

The substituted $R_1$ may also sand for saturated and unsaturated aliphatic and cyclic radicals in which the carbon chain is interrupted by oxygen or sulfur, for example 3-methoxy-propyl-(1)-, 3-ethoxy-propyl-(1)-, 3-butoxy-propyl-(1)-, alphatetrahydrofuryl-methyl-, 3-methyl-mercapto-propyl-(1)-, or 3-ethyl-mercapto-propyl-(1). $R_1$ may also represent phenyl-alkyl radicals the alkyl chains of which contain 2-4 carbon atoms, for example β-phenyl-ethyl-, gamma-phenyl-propyl or delta-phenyl-butyl.

The invention also provides a process for the manufacture of the above compounds.

The desired sulfonyl ureas can be obtained by reacting benzothiazol-2-sulfonamide, suitably in the form of its alkali metal salts, with isocyanates of the formula $R_1$—NCO, wherein $R_1$ has the meanings given above. Instead of isocyanates there may also be used compounds which in the course of the reaction behave like isocyanates for example acid azides.

The reaction conditions under which the process can be carried out may be varied within wide limits and these conditions can be adapted to each particular case. The reaction may be carried out for example in the presence of a solvent, for example in nitrobenzene, acetone or aqueous acetone, at normal temperature or at a raised temperature. It is preferred however to operate at a temperature of between 0 and 60° C.

The starting materials used in the process of this invention are compounds that have already been described in the literature. The following isocyanates for example are suitable for reaction with benzothiazol-2-sulfonamide:

As alkyl-isocyanates there may be mentioned for example: ethyl-, n-propyl-, isopropyl-isocyanate; butyl-(1)-, butyl-(2)-isocyanate; 2-methyl-propyl-(1)-isocyanate; 2-methyl-propyl-(2)-isocyanate; pentyl-(1)-isocyanate; pentyl-(2)-isocyanate; pentyl-(3)-isocyanate; 3-methylbutyl-(1)-isocyanate; 2-methylbutyl-(1)-isocyanate; 2.2-dimethylpropyl-(1)-isocyanate; 3-methyl-butyl-(2)-isocyanate; hexyl-isocyanates, such as hexyl-(1)-isocyanate or 2-methylpentyl-(1)-isocyanate; heptyl-isocyanates, such as heptyl-(1)-isocyanate and heptyl-(4)-isocyanate; or octyl-isocyanates, such as octyl-(1)-isocyanate.

Furthermore there may be used as alkenyl isocyanates allyl isocyanate or crotyl isocyanate; as cycloalkyl isocyanates cyclopentyl-isocyanate, cyclohexyl-isocyanate and cycloheptyl-isocyanate; and as cycloalkylalkyl-isocyanates cyclohexylmethyl-isocyanate and cyclohexylethyl-isocyanate.

As aliphatic or cycloaliphatic isocyanates interrupted by oxygen or sulfur there may be used for example: 2-methoxy-ethyl-isocyanate, 2-ethoxy-ethyl-isocyanate; 2-propoxy-ethyl-isocyanate, 3 - methoxy-propyl-isocyanate, 3-ethoxy-propyl-isocyanate, 4 - methoxy-butyl-isocyanate, 3 - methylmercapto-propyl-isocyanate and 3-ethyl-mercapto - propyl - isocyanate. As phenylalkyl-isocyanates there may be used more especially β-phenylethyl-isocyanate, gamma-phenyl-propyl-isocyanate or delta-phenyl-butyl-isocyanate.

Instead of the aforesaid isocyanates there may also be used for reaction with benzothiazol-2-sulfonamide according to this invention compounds which are converted to isocyanates in the course of the reaction, for example carbamic acid halides and carboxylic acid azides.

The compounds obtained by this invention have a great stability. As compared with the aminobenzene-sulfonamides which gained importance in chemotherapy, the compounds of this invention have a remarkable stability against oxidizing influences. They are valuable medicaments and possess a remarkable blood-sugar reducing activity. As compared with the known aminobenzene sulfonamides the compounds of the invention have no chemotherapeutic action comparable to that of the sulfanilamides due to the lack of an amino-group in the para-position. For example, they do not influence the intestinal flora and involve no resistance formation of pathogenic germs even when administered for a prolonged time. Pharmacological tests on rabbits have shown that the oral administration of 400 mg. of N-benzothiazol-2-sulfonyl-N'-butyl-(1)-urea in the form of the sodium salt per kilogram of body weight averaged a reduction of the blood sugar level of 35%. After administration of N-benzothiazol-2-sulfonyl-N'-hexyl-(1)-urea, the blood sugar level was reduced by 30% while the reduction was 25% after administration of the corresponding cyclohexyl urea.

The experiments made on rabbits were confirmed with other control animals. If N-benzothiazol-2-sulfonyl-N'-butyl-(1)-urea obtained by this invention is orally administered to dogs in a dose of 100 mg. per kilogram of body weight, it is found that the blood sugar level is reduced within 3 hours by 45%; after 6 hours the reduction still amounts to 15% and only after 24 hours do the initial values reappear.

The above values were determined by comparison with the blood sugar values measured on similarly fed but untreated control animals. The blood sugar values can be measured by hourly analyses according to the method of Hagedorn/Jensen.

The products obtained by this invention are very little toxic. The lethal dose on (LD-50) white mice for benzothiazol-2-sulfonyl-N'-butyl-(1)-urea for example is 4.5 grams per kilogram of body weight.

The products of this invention are intended primarily for the manufacture of orally applicable preparations having a blood sugar reducing activity for the treatment of diabetes mellitus.

The products may be used as such or in the form of their salts or in the presence of a substance which causes salt formation and more especially in the presence of ammonia, alkaline agents, such as alkali metal hydroxides or alkaline earth metal hydroxides, alkali metal carbonates or bicarbonates, and also physiologically tolerated organic bases.

The following examples serve to illustrate the invention but they are not intended to limit it thereto.

EXAMPLE 1

*N-benzothiazol-2-sulfonyl-N'-butyl-(1)-urea*

13.8 grams of n-butylisocyanate were slowly added dropwise while stirring at 0° C. to a solution of 26.8 grams of benzothiazol-2-sulfonamide in 125 cc. of 1 N-sodium hydroxide solution and 125 cc. of acetone, and stirring was continued for one hour. The solution was then concentrated to half its volume, diluted with water and filtered. The filtrate was acidified with hydrochloric acid, the precipitate which had separated was suction-filtered and dissolved in 600 cc. of aqueous ammonia of 2% strength. The solution was clarified with charcoal and acidified with hydrochloric acid. N-benzothiazol-2-sulfonyl-N'-butyl-(1)-ureau obtained in good yield was suction-filtered, washed well with water, then dried and recrystallized from acetonitrile. The substance melted at 153–154° C.

EXAMPLE 2

*N-benzothiazol-2-sulfonyl-N'-hexyl-(1)-urea*

In a manner analogous to that described in Example 1 N-benzothiazol-2-sulfonyl-N'-hexyl-(1)-urea was obtained in good yield from 31 grams of benzothiazol-2-sulfonamide and 15.9 grams of n-hexyl-isocyanate in the presence of 145 cc. of 1 N-sodium hydroxide solution. The substance melted at 136–138° C. after recrystallization from acetonitrile.

With the use of cyclohexylisocyanate there was obtained in an analogous manner N-benzothiazol-2-sulfonyl-N'-cyclohexyl urea. The melting point was 184–185° C. (from acetonitrile).

We claim:

1. A member selected from the group consisting of benzothiazol-2-sulfonyl-ureas of the general formula

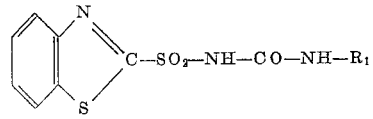

wherein $R_1$ is selected from the group consisting of an alkyl radical containing from 2 to 8 carbon atoms, inclusive, an alkenyl radical containing from 3 to 4 carbon atoms, inclusive, a cycloalkyl radical containing from 5 to 7 carbon atoms, inclusive, a cycloalkylalkyl radical containing from 7 to 8 carbon atoms, inclusive, an alkoxy alkyl radical containing from 3 to 7 carbon atoms, inclusive, and a phenylalkyl radical wherein the alkyl radical contains from 2 to 4 carbon atoms, inclusive, and non-toxic basic salts thereof.

2. N-benzothiazol-2-sulfonyl-N'-butyl-(1)-urea.
3. N-benzothiazol-2-sulfonyl-N'-hexyl-(1)-urea.
4. N-benzothiazol-2-sulfonyl-N'-cyclohexyl-urea.

References Cited in the file of this patent

UNITED STATES PATENTS 2,595,334     Clapp et al. _____ May 6, 1952

FOREIGN PATENTS 466,950     Canada _____ Aug. 1, 1950